(12) United States Patent
Steinauer et al.

(10) Patent No.: US 6,288,532 B1
(45) Date of Patent: Sep. 11, 2001

(54) SPEED SENSOR HAVING A UV-CURED GLUE SEAL AND A METHOD OF APPLYING THE SAME

(75) Inventors: Timothy J. Steinauer; Gary P. Schneider, both of Janesville, WI (US)

(73) Assignee: SSI Technologies, Inc., Janesville, WI (US)

( * ) Notice: Subject to any disclaimer, the term of this patent is extended or adjusted under 35 U.S.C. 154(b) by 0 days.

(21) Appl. No.: 09/345,367

(22) Filed: Jul. 1, 1999

Related U.S. Application Data

(62) Division of application No. 09/157,117, filed on Sep. 18, 1998.
(60) Provisional application No. 60/092,915, filed on Jul. 15, 1998.

(51) Int. Cl.$^7$ ........................................ G01P 3/488
(52) U.S. Cl. ..................... 324/173; 324/262; 174/52.3
(58) Field of Search .................... 73/514.39, 493; 324/160, 173, 174, 207.25, 207.21, 207.15, 207.16, 261, 262; 336/90, 92, 96; 174/52.1, 52.2, 52.3

(56) References Cited

U.S. PATENT DOCUMENTS

| | | | |
|---|---|---|---|
| 4,680,543 | * | 7/1987 | Kohen ........................... 324/207.15 |
| 5,039,942 | * | 8/1991 | Buchschmid et al. ............... 324/174 |
| 5,278,496 | * | 1/1994 | Dickmeyer et al. ................. 324/174 |
| 5,629,618 | | 5/1997 | Babin et al. ........................... 324/173 |
| 5,733,145 | * | 3/1998 | Wood .................................... 439/604 |
| 5,744,951 | * | 4/1998 | Babin et al. ......................... 324/174 |
| 5,764,057 | * | 6/1998 | Stanevich ............................. 324/173 |
| 5,789,920 | * | 8/1998 | Gass ................................. 324/207.15 |
| 5,896,029 | * | 4/1999 | Singbartl ............................. 324/173 |

* cited by examiner

Primary Examiner—Helen Kwok
(74) Attorney, Agent, or Firm—Michael Best & Friedrich LLP

(57) ABSTRACT

A speed sensor assembly is provided that isolates the internal components of the speed sensor from detrimental external environmental influences. Further provided is a new seal that seals between a housing and an overmold of a speed sensor and is capable of use in speed sensors of varying types and of all different sizes and shapes. Provided is a seal in which a bead of glue cured by ultraviolet light is applied around part of the exterior surface of a housing, after which an injected molded plastic overmold is applied over at least that part of the housing having the applied ultraviolet cured glue. In this way, once the housing is overmolded, the ultraviolet cured glue forms a gasket-like seal between the housing and the overmold preventing the penetration of water or other contaminants into the internals of the speed sensor. Also provided is a mounting fixture for use during a process of applying the seal to the housing.

9 Claims, 3 Drawing Sheets

SPEED SENSOR HAVING A UV-CURED GLUE SEAL AND A METHOD OF APPLYING THE SAME

CROSS-REFERENCE APPLICATION

This application claims the benefit of U.S. Provisional Application No. 60/092,915, filed Jul. 15, 1998. This application is also a divisional of co-pending U.S. Application Ser. No. 09/157,117, filed on Sep. 18, 1998.

FIELD OF THE INVENTION

The invention relates to a sensor for detecting the angular velocity of a rotating element, and more particularly, to a speed sensor for use in a vehicle anti-lock braking system or transmission. Specifically, the invention relates to a new seal that protects the internal components of a sensor from exposure to external environmental elements, as well as a new method for applying the seal to a sensor.

BACKGROUND OF THE INVENTION

It is known in the art to mount a speed sensor in the transmission or in the bearing or wheel end assembly of a vehicle such as a truck or an automobile. The sensor measures the angular velocity of a rotating element within the transmission or bearing assembly. Typically, sensors of this type utilize variable reluctance, a form of electromagnetic sensing, generally known and understood by those skilled in the art. Such sensors are used in transmissions to assist in electronic shifting and in vehicle anti-lock braking (ABS) systems to detect wheel speed.

Generally, sensors of this type include a coil mounted on a bobbin which is inserted into a housing. A wheel speed sensor for use in an ABS application typically is connected or bolted into a hub assembly which is located by a brake, usually a front brake, of a vehicle. A tone wheel rotates with or around an axle, typically a front axle, and induces a voltage signal within the wheel speed sensor. The wheel sensor communicates with an on-board controller or computer of the vehicle when any of the vehicle's four wheels lock-up in a panic breaking situation. The sensor sends a voltage signal to the computer and the computer determines if a correct voltage signal has been sent. Based on the signal received, if the computer determines that any of the wheels of the vehicle has locked-up, the vehicle computer automatically takes over and controls the vehicle braking system, pumping each brake for a safer controlled, skid-free stop.

The environment in which sensors of this type are subjected can be extremely harsh and, as a result, the sensors must be capable of withstanding a significant amount of repeated temperature variations over a wide range of temperatures (thermal cycling), intense vibration and exposure to corrosive elements. One such wheel speed sensor is described in commonly assigned U.S. Pat. No. 5,629,618, which is hereby incorporated by reference. In the '618 patent, a wheel speed sensor is described such that in order to seal the sensor from the environment, a bobbin is connected to a housing and the combination is overmolded with an injected molded plastic cover, i.e., an overmold, to provide a molded seal between the bobbin and the housing.

SUMMARY OF THE INVENTION

Speed sensors can be of many different shapes and sizes. The overall configuration of a speed sensor is largely dependant on the type and make of vehicle in which the speed sensor will be placed.

One problem with known sensors is that if the bobbin and the housing do not form a mechanical seal between one another, the potential exists for water or other outside influences to flow into the interior of the speed sensor and damage the coil. The '618 patent describes a speed sensor having a housing that provides a sealed environment for a bobbin and a coil.

Another problem, similar to the problem described above, is that if an overmold does not provide a proper seal between a housing and a bobbin/terminal area, water or other contaminants can leak into the interior of the speed sensor and damage the coil or other internal components. Without a mechanical bond or seal between the overmold and the housing, there is not a hermetic seal, i.e., airtight and impervious to external influences. Further, the extreme temperatures and other external influences to which the sensor is subjected can cause additional degradation of the seal. One solution to the problems described above is to use an O-ring external seal between an overmold and a cooperating housing. Another solution to this problem is to use an externally applied ultraviolet cured glue to seal a housing to a surface of an overmold. However, both of these solutions require speed sensor assemblies that are relatively large in shape. For example, if an external O-ring is used, the overmold must be of sufficient size to allow for the placement of the O-ring between the overmold and the housing. The diameter of the overmold near the location where an O-ring is positioned must be about 5.5 mm greater than the diameter of the housing, or 2.75 mm per side, in order to provide sufficient space for an externally applied O-ring. In the case of externally applied ultraviolet cured glue, the surface upon which the glue is dispensed must be large enough to accommodate the applied glue. Similar to the requirements necessary for use of an external O-ring, the surfaces upon which externally applied glue is applied require a total of about 5.5 mm of space available to which glue may be applied. The diameter of an overmold according to the present invention is only about 3.5 mm larger than the diameter of the housing near that location where a conventional O-ring or externally applied ultraviolet glue would be used. Also the diameter of the overmold of the present invention is offset in its relationship to the housing by about 0.9 mm near the location where a conventional O-ring or externally applied ultraviolet glue might be considered. Thus, these prior sealing techniques are not capable of use in a speed sensor of the present invention.

There are other problems with these prior art techniques that prevent widespread use of such prior sealing means in all applications. The O-ring sealing technique requires an extremely detailed and complex injection molding fixture in order to provide an annular grove in the overmold for placement of an O-ring between the housing and the overmold to seal the connecting surfaces of these two pieces. Once molded, further assembly is required wherein the O-ring must be installed in the annular groove after the injection molding process. This additional assembly adds delay and cost to the overall manufacturing process.

When using the externally applied ultraviolet cured glue sealing technique, the part receiving the glue must have two edges large enough for the glue to rest upon. Not all speed sensors are designed to include these two edges or even large enough edges. As noted, the overall configuration of a speed sensor is largely dependent on the type and make of vehicle in which the speed sensor will be placed. Moreover, it has been observed that externally applied ultraviolet cured glue is susceptible to thermal breakdown as a result of the harsh environments to which the sensors are subjected. Another problem with externally applied ultraviolet cured glue is that the shape of such an applied glue is only controlled by the applicator. If not properly or evenly applied, the glue may cure leaving a gap between the parts to be sealed. Also, an uneven glue application may create a glue seal that is thin at various locations around the sealed part thereby leaving a weak seal point. In such situations, water or some other contaminant may find its way to the core of the speed sensor and short out the electrical function of the sensor.

Thus, what is needed is a speed sensor assembly that provides a sealed environment to isolate the internal components of the sensor from detrimental external forces. What is further needed is a new seal that seals between a housing and an overmold of a speed sensor, and yet is capable of use in a speed sensor of all different sizes and shapes. In other words, what is needed is a seal means that does not require a speed sensor to be of a particular size and shape such as those needed for conventional sealing techniques. What is also needed is a new method of applying an ultraviolet cured glue to a speed sensor that eliminates application problems of conventional glue sealing techniques.

The solution to providing a speed sensor assembly that seals and protects the internal parts of the speed sensor from harsh environmental conditions resides in providing a seal in which a bead of glue cured by ultraviolet light is applied around part of the exterior surface of a housing, after which an injected molded plastic overmold is applied over at least that part of the housing having the applied ultraviolet cured glue. In this way, once the housing is overmolded, the ultraviolet cured glue forms a gasket-like seal between the housing and the overmold preventing the penetration of water or other contaminants into the internals of the speed sensor.

The solution to evenly distributing a glue seal to a speed sensor housing resides in providing a fixture, made from a material in which ultraviolet cured glue will not adhere, such that the housing is vertically located upon the fixture wherein a groove is provided between the housing and the fixture so that the bead can be applied in proper shape and form around the outside surface of the housing.

A principal feature of the invention is the provision of a sensor having a housing, an overmold and an ultraviolet cured glue seal between the housing and the overmold such that a seal is created to prevent the introduction of water or other contaminants into the interior of the sensor.

Yet another feature of the invention is the provision of a seal means that is capable of use in all appropriate sensors and which is not dependent on the size of the sensor.

A further feature of the invention is the provision of a method to control the size and shape of an applied seal placed between a housing and an overmold of a sensor.

Yet a further feature of the invention is the provision of a fixture adapted to receive a housing of a sensor and which locates the housing in an appropriate position as a seal means is applied around part of the external surface of the housing such that the seal is evenly applied around the surface.

Other features and advantages of the invention will become apparent to those skilled in the art upon review of the following detailed description, claims, and drawings.

Figure 1:
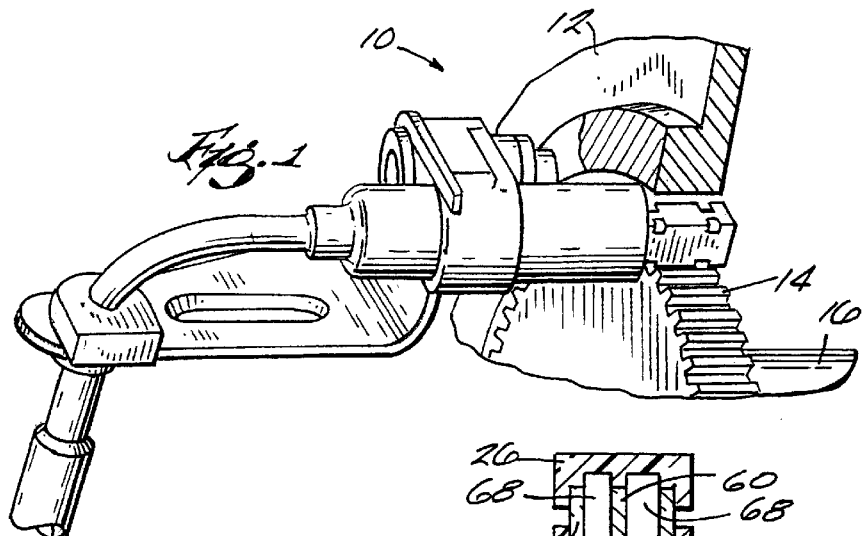
FIG. 1 is a perspective view of a speed sensor embodying the invention.

Before one embodiment of the invention is explained in detail, it is to be understood that the invention is not limited in its application to the details of construction and to arrangements of components set forth in the following description or illustrated in the drawings. The invention is capable of other embodiments and is capable of being practiced or of being carried out in various ways. Also, it is to be understood that the phraseology and terminology used herein is for the purpose of description and should not be regarded as limiting.

DESCRIPTION OF THE PREFERRED EMBODIMENTS

Figure 5:
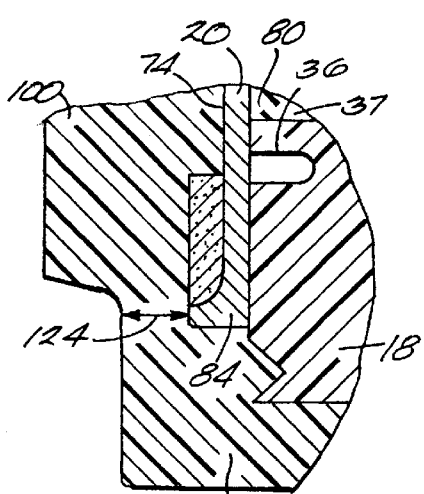
FIG. 5 is a partial, enlarged cross-section showing in more detail the seal between the can and the overmold.

Shown in FIG. 1 of the drawings is a speed sensor 10 embodying the invention. As is described below, a new seal 100 according to the present invention and shown, for example in FIGS. 3–5, is provided within the speed sensor 10 to isolate the internal components of the speed sensor from external influences.

The speed sensor 10 detects angular velocity of a rotating member such as a rotating bearing element of a bearing assembly in a vehicle wheel or a rotating element in the transmission of a vehicle such as an automobile or truck. While such sensors are commonly used as both transmission speed or wheel speed sensors, the sensor 10 is a wheel speed sensor for use in a vehicle anti-lock brake system. Sensor 10 is connected to a hub assembly 12 which is located by a brake (not shown), usually a front brake, of a vehicle. A tone wheel 14 rotates with a front axle 16 and induces an alternating voltage signal within the wheel speed sensor. Such wheel speed sensors and their operation are generally known to those skilled in the art.

Figure 4:
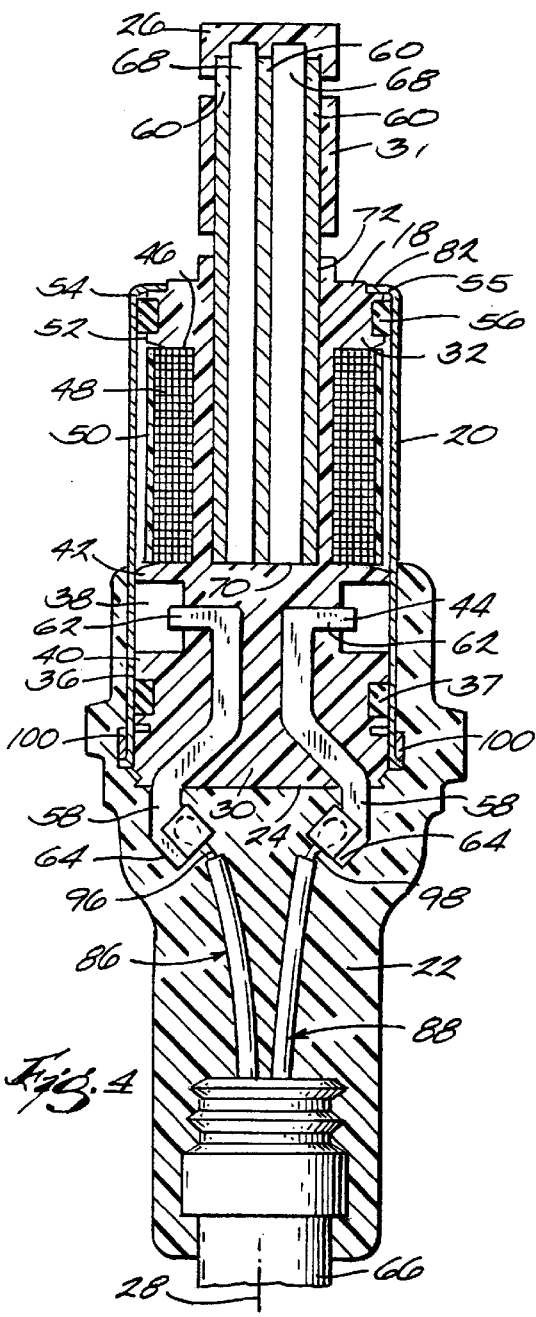
FIG. 4 is a central cross-section of the speed sensor as shown in FIG. 3.
Figure 2:
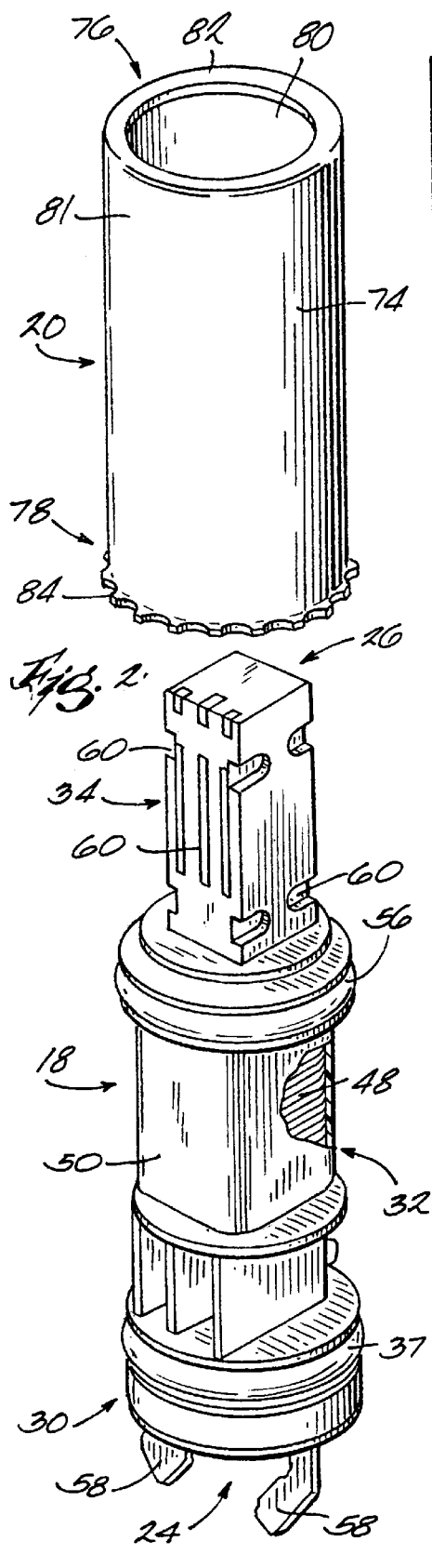
FIG. 2 is an exploded perspective view of a bobbin and a can of a speed sensor similar to that shown in FIG. 1.
Figure 3:
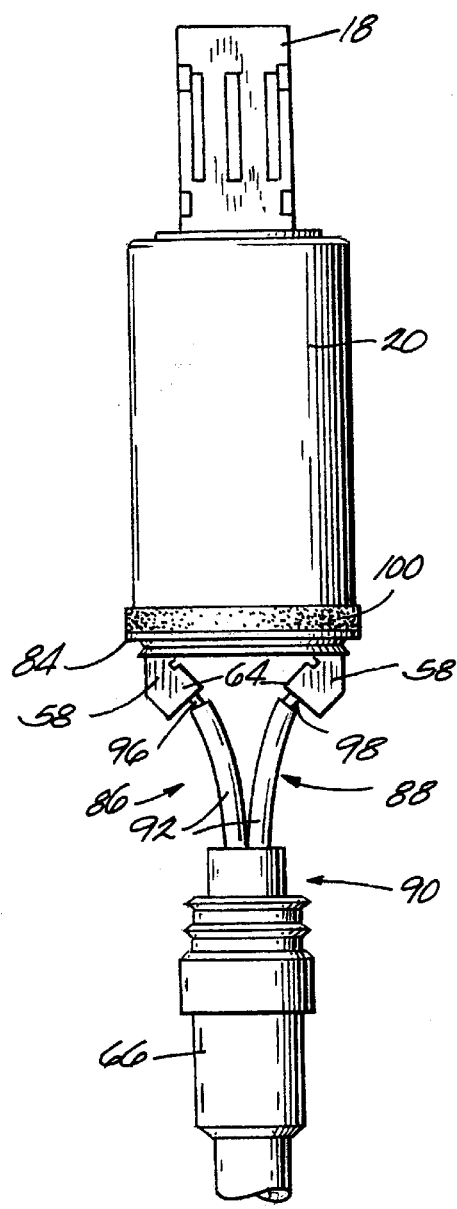
FIG. 3 is a side elevational view of the speed sensor of FIG. 2.

As shown in FIGS. 2–4, the sensor includes a bobbin or bobbin assembly 18 that fits within a housing or can 20. While the can 20 shown in the drawings is generally cylindrical (i.e., circular in cross section), it should be understood that housings or cans having different cross-sectional configurations (e.g., oval, rectangular, pentagonal, hexagonal, etc.) are appropriate. The combination of the can 20 and bobbin 18 is overmolded to form the finished product, as shown in FIG. 1.

The bobbin 18 is generally a cylindrical injection molded plastic shell. Referring to FIGS. 2 and 4, the bobbin 18 has opposite ends 24 and 26. The bobbin 18 includes a top portion 30, a middle portion 32, a bottom portion 34, and an axis 28. The top portion 30 has an annular groove 36, and an O-ring 37 is typically placed within the annular groove 36 in order to assist in creating a seal between the can 20 and bobbin 18. Top portion 30 also includes an annular recess 38, and terminal 44 is positioned in recess 38. The top portion 30 also includes a shoulder 40 between the annular groove 36 and annular recess 38, and a shoulder 42 adjacent the annular recess 38. Shoulder 42 defines one end of the top portion 30.

Still referring to FIGS. 2 and 4, middle portion 32 includes an annular recess 46 located adjacent the shoulder 42 of the top portion 30 of the bobbin 18. An induction coil 48 mounts within the annular recess 46. The coil 48 is an electrical conductor such as copper wire that is wound around bobbin 18 and within the recess 46. The electrical properties of the coil 48 may vary depending upon the number of turns of the electrical conductor and the thickness or gauge of the conductor. These variables are dictated by the particular application in which the sensor is being used. A piece of electrically insulating tape 50 is wound around the coil 48 to secure the coil 48 in place in the recess 46. Middle portion 32 includes a shoulder 52. As the top of recess 46 is bordered by shoulder 42, the bottom of recess 46 is bordered by shoulder 52. Middle portion 32 has an annular groove 54, and an O-ring 56 is typically placed within the annular groove 54 to further assist is maintaining a seal between the can 20 and the bobbin 18.

FIG. 4 best shows a pair of electrically conductive leads 58, steel pole pieces 60 and permanent magnets 68 molded into bobbin 18. Each lead 58 includes opposite ends 62 and 64. One of the ends 62 defines the terminal 44 positioned in the annular recess 38. The other ends 64 extend beyond the top portion 30 of the bobbin 18. The ends 64 provide an electrical connection with a cable 66, shown best in FIGS. 2–4. Cable 66 is shown in FIGS. 3 and 4 connected to ends 64 of leads 58. Cable 66 has electrical wires 86 and 88 protruding out from an end 90 of cable 66. The electrical wires 86 and 88 are surrounded by plastic sheaths 92 to protect the wires from damage. The ends 96 and 98 of wires 86 and 88, respectively, are soldered to ends 64 of leads 58 to make an electrical connection. The cable 66 transmits the voltage signal produced in the sensor to the vehicle computer.

The coil 48 terminates with a pair of electrically conductive lead wires (not shown). As will be understood by those skilled in the art, the lead wires are normally skeined (i.e., braided for increased strength), and extend from annular recess 46 to the respective terminals 44 of the electrical leads 58, in a manner known to those skilled in the art. As also generally understood, the lead wires are soldered to the respective terminals 44 in order to make a secure electrical connection between the lead wires of the coil 48 and the electrically conductive leads 58 molded into the bobbin 18.

As best shown in FIGS. 2 and 4, the bobbin 18 is molded around the permanent magnets 68 and steel poles 60 such that the magnet 68 and poles 60 extend from the bottom portion 34 of bobbin 18 through the middle portion 32 of bobbin 18. The magnets 68 alternate between the pole pieces 60 such that, looking from left to right in FIG. 4, there is a first located pole piece, followed by a magnet, followed by a pole piece, followed by a magnet, and finally terminating with another pole piece. In this way, the magnets 68 and poles 60 are located within the interior 70 of bobbin 18 and portions of the magnet 68 and poles 60 are located in a channel 72 of bobbin 18 beneath coil 48. The magnets 68 engage the poles 60 to provide a permanent source of magnetic flux. The contact between the poles 60 and the magnets 68 provides a low reluctance flux path for the magnetic field generated by the magnets 68.

The can 20 of a typical sensor such as that shown in FIG. 1 is best shown in FIG. 2. The can 20 has a cylindrical sidewall 74 having opposite ends 76 and 78. The cylindrical sidewall 74 has a generally cylindrical inner surface 80 and outer surface 81. The top end 76 has a circular inwardly facing lip 82. The bottom end 78 has a circular outwardly facing serrated edge 84. As shown in FIG. 2, can 20 is adapted to mount over bobbin 18. FIGS. 3 and 4 show can 20 installed over and around bobbin 18.

With reference to FIG. 4, the lip 82 of the can 20 rests on shoulder 55 of the middle portion 32 of bobbin 18 when can 20 is mounted on bobbin 18. As also shown in FIG. 4, O-rings 37 and 56 provide a seal between the can 20 and bobbin 18 so as to prevent the intrusion of water or other contaminants between the contacting surfaces of the can 20 and bobbin 18 so as to assist in preventing the coil 48, terminals 44, or other noted internal components, from becoming damaged or creating a short in the electrical circuit.

Still referring to FIG. 4 and as also shown in FIG. 5, a seal 100 incorporating the principles of the invention is shown between the can 20 and an overmold 22. Prior to mounting the can 20 on the bobbin 18, a seal 100 is applied to the bottom of the can 20 at the serrated edge 84 as shown, for example, in FIGS. 6 and 7.

The overall assembly of a typical sensor is now described. Bobbin 18 is formed of injected molded plastic. Poles 60, magnets 68, and leads 58 are positioned such that as bobbin 18 is created, poles 60, magnets 68 and leads 58 are molded into bobbin 18. Following the bobbin creation step, O-rings 37 and 56 are inserted within annular groves 36 and 54, respectively, and coil 48 is wrapped around bobbin 18 within annual recess 46. Tape 50 is applied around coil 48 and the lead wires of coil 48 are connected to terminals 44 as previously outlined.

In a separate assembly, usually simultaneous with the bobbin assembly step, a generally cylindrical, hollow can 20 is created. Can 20 may be made from various materials but most preferably is made of stainless steel. The bottom of can 20 has a serrated edge 84 and the top of can 20 has a lip 82. Around part of the exterior surface of can 20, a bead of acrylic anaerobic glue 100 is applied directly adjacent the serrated edge 84 of can 20. The method of applying the glue 100 to the can 20 will be further described below. Once the glue 100 has been applied to the can 20 and the glue has cured, can 20 is slidably placed over bobbin assembly 18. Can 20 is positioned over bobbin 18 such that lip 82 of can 20 abuts shoulder 55 of bobbin 18.

In a further separate assembly, usually simultaneous with the other separate assembly steps, cable 66 is assembled. Once can 20 has been positioned over bobbin 18, ends 96 and 98 of wires 86 and 88, respectively, of cable 66 are soldered to respective ends 64 of leads 58.

After cable 66 has been attached to bobbin 18, plastic overmold 22 is injected and molded around parts of the can 20, bobbin 18, and cable 66. Overmold 22 may be of any number of suitable injected molded plastics but glass filled Nylon, available from Loctite Corporation of Rocky Hill, Conn., has been found to be particularly suitable for speed sensors described herein. After the overmold 22 has been applied to the sensor, the sensor goes through further final assembly steps, known to those skilled in the art and not pertinent to the subject invention, until a final sensor assembly, such as sensor 10 shown in FIG. 1 is ready for use.

Until the invention of the subject application, without a proper seal between an overmold package and a can, water or other contaminants would leak into a bobbin/terminal area of a speed sensor causing the sensor to malfunction. The present invention provides a seal between an overmold and a can to prevent this type of failure.

As shown in FIGS. 3–7 and best shown in FIG. 5, a gasket-like seal of acrylic anaerobic ultraviolet cured glue 100 is placed between an overmold 22 and a can 20. Placing the ultraviolet cured glue 100 between the plastic overmold 22 and can 20 will effectively stop the penetration of water or other contaminants into the terminal area of bobbin 18.

Figure 6:
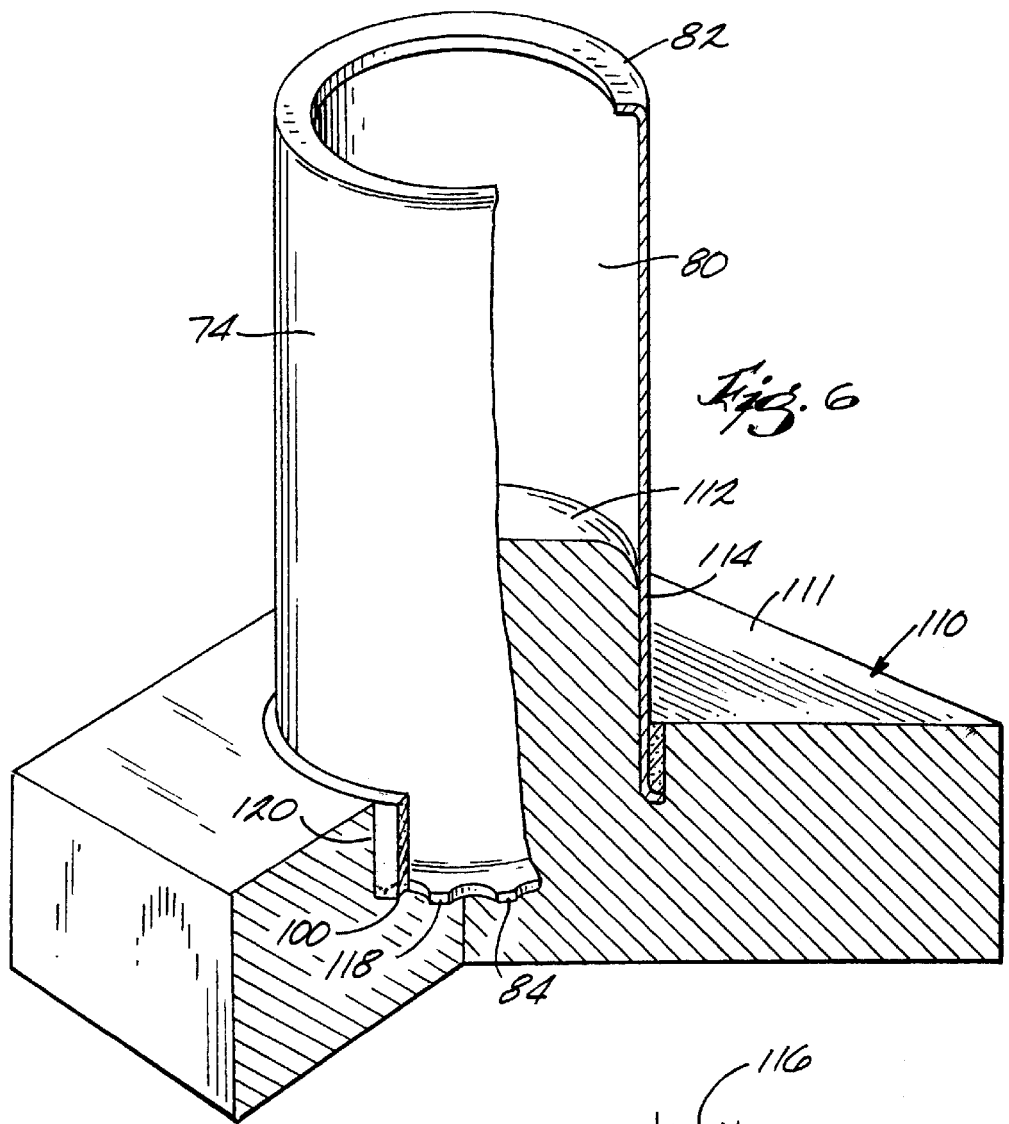
FIG. 6 is a perspective view with portions broken-away of a mounting fixture embodying the invention. The mounting fixture is employed in applying the ultraviolet cured glue to the can.
Figure 7:
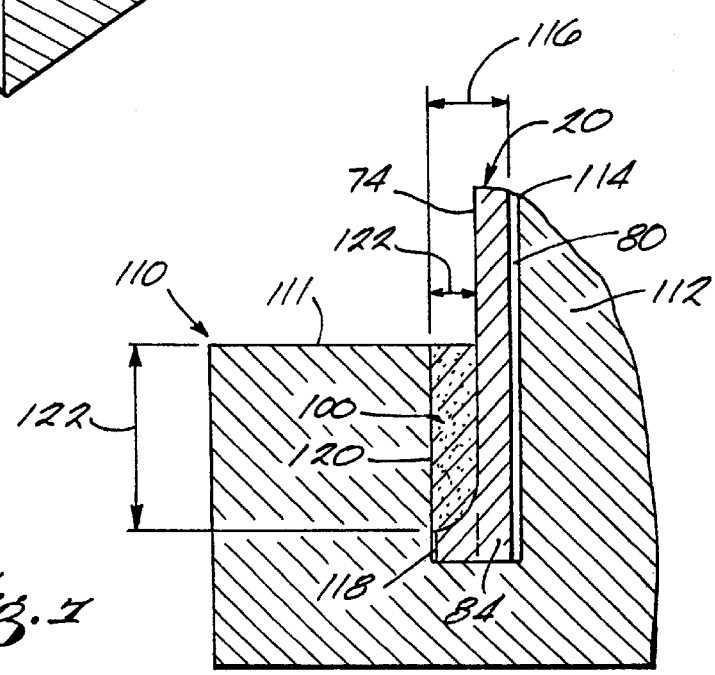
FIG. 7 is a partial, enlarged cross-section showing in greater detail the cooperation between the can and the mounting fixture during the creation of the seal of the present invention.

With particular reference to FIGS. 6 and 7, a method of applying an ultraviolet cured glue to a can of a speed sensor is described.

A mounting fixture 110 having a base 126, a top surface 111 defining a locating post 112 to locate can 20 during a glue seal application process. The fixture 110 may have one locating post 112 or any number of locating posts 112, depending on the size of the fixture 110. In alternative embodiments, not shown, the top surface may simply include recesses formed in the top surface for locating the cans.

The locating post 112 is generally circular in shape and has an exterior surface 114. It should be noted, however, that locating post 112 may be of any shape depending on the shape of the interior 80 of can 20. The locating post 112 extends above the top surface of the fixture 110. Within the fixture 110 and positioned around the locating post 112, is an annular groove 116. The annual groove 116 is adapted to receive part of can 20. As can 20 is placed over locating post 112, outside edges 118 of serrated edge 84 practically abut wall 120 of fixture 110, wall 120 being defined by groove 116. Opening 122 is defined between the sidewall 74 of can 20 and wall 120. Once can 20 is positioned over locating post 112 and opening 122 is created, glue 100 is deposited within opening 122.

Glue 100 is generally an acrylic anaerobic glue curable by exposure to ultraviolet rays. However, Loctite 352, available from Loctite Corporation of Rocky Hill, Conn., has been found to be particularly suited for the subject invention. Glue 100 is deposited in opening 122 in any number of ways, generally known to those skilled in the art. For example, a glue applicator (not shown) having a glue dispensing needle nozzle (not shown) may travel around opening 122 depositing glue within the opening 122.

Another method of filling opening 122 with glue 100 may be accomplished by utilizing a stationary glue applicator whereby the fixture 110 rotates around the glue applicator such that the opening 122 is filled with glue 100 via a fixed glue applying nozzle. Because of the properties of glue 100, when applied, the glue will center itself and evenly fill the opening 122. Thus, a substantially symmetrical bead of glue is applied around the can.

Once glue 100 is positioned within opening 122, the glue is subjected to an ultraviolet light source to cure the glue in a manner generally understood by those skilled in the art. The normal cure time for acrylic anaerobic glue exposed to ultraviolet light is generally 10–30 seconds. After the glue 100 has been subjected to an ultraviolet light source, the can 20 is removed from locating post 112. Because the fixture 110 is made of a material that does not bond with ultraviolet cured glue 100, and because the serrated edge 84 provides a ledge upon which the glue 100 is placed, when the can 20 is removed from the locating post 112, a substantially uniform ring of glue 100 is affixed to a part of can 20 (see FIG. 3). The fixture 110 may be composed of many different materials, but it has been observed that plastic nylon, sometimes referred to as Delrin, or Teflon coated material, Delrin and Teflon are registered Trademarks of E.I. Du Pont De Nemours Company, works well with the subject invention.

As shown in FIGS. 3–7, and best shown in FIG. 4, it can be seen that the amount of a glue 100 applied to can 20 does not substantially protrude beyond the outside edges 118 of the serrated edge 84. Generally, the glue seal 100 can extend slightly greater than or less than one millimeter beyond the outside edge 118 of the serrated edge 84. This is important so that when the overmold 22 is applied around can 20, there remains sufficient overmold material 124 to prevent a weak spot in the overmold where the can 20 and overmold 22 seal together. This will help ensure that water will not find its way to the terminal area of bobbin 18 and potentially cause damage to the sensor. It should be noted that the ultraviolet cured glue seal positioned between a can and an overmold is located farther from the end of an overmold than where conventionally applied O-rings or externally applied glue are applied. Various features of the invention are set forth in the following claims.

We claim:

1. A mounting fixture assembly for locating a can of a speed sensor to which a seal is applied, the speed sensor being used for detecting angular velocity of a rotating member, said mounting fixture assembly comprising:

a solid base having a top surface and a bottom surface, said top surface forming a groove projecting into said base from the top surface of said base; and said groove having dimensions such that, when a portion of the can of the speed sensor is positioned in said groove, an opening is defined between the can and a wall of the groove to allow a seal to be positioned in said opening about said can, such that said can and said seal are thereafter removed from said groove and said mounting fixture assembly for further assembly with other components of the speed sensor.

2. A mounting fixture according to claim 1, wherein said fixture assembly further comprises a locating post, and wherein said groove is positioned around said locating post.

3. A mounting fixture according to claim 2, wherein said locating post extends above said top surface of said base.

4. A mounting fixture according to claim 2 wherein said base and said locating post are of a single integral construction.

5. A mounting fixture according to claim 1 wherein said base is of a plastic nylon material.

6. A mounting fixture according to claim 1 wherein the groove is a generally circular groove.

7. A mounting fixture according to claim 1, wherein said seal is a glue seal which is curable by ultraviolet light.

8. A method of positioning a seal about a can of a speed sensor which is used for detecting angular velocity of a rotating member, said method comprising the acts of:

placing a can having a substantially hollow interior onto a mounting fixture assembly having a groove formed therein and adapted to receive the can such that an opening is created between an outer surface of the can and a wall of the groove;

positioning a seal within the opening about the can; and removing the can and the seal placed thereabout from the groove and mounting fixture.

9. A method according to claim 8, wherein the seal is a glue seal, and wherein after the seal is positioned within the opening, the method further comprises the act of curing the glue seal using ultraviolet light prior to removing the can and the seal placed thereabout from the groove and the mounting fixture.

* * * * *